Figure 1:
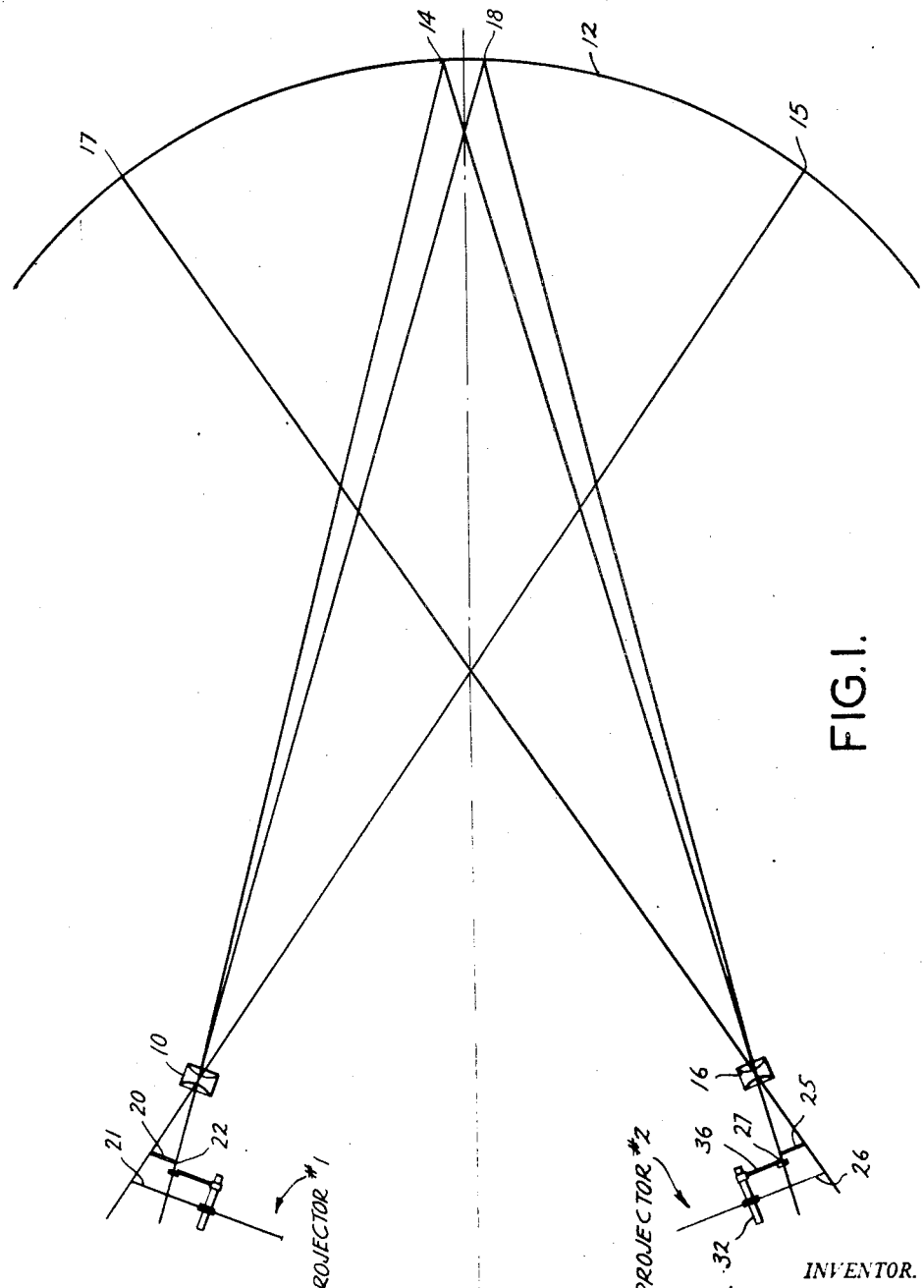

March 6, 1951  F. WALLER ET AL  2,544,116
MASKING OF MARGINAL EDGES OF OVERLAPPING
IMAGES OF MOSAIC PICTURES
Filed Jan. 8, 1948  4 Sheets-Sheet 2
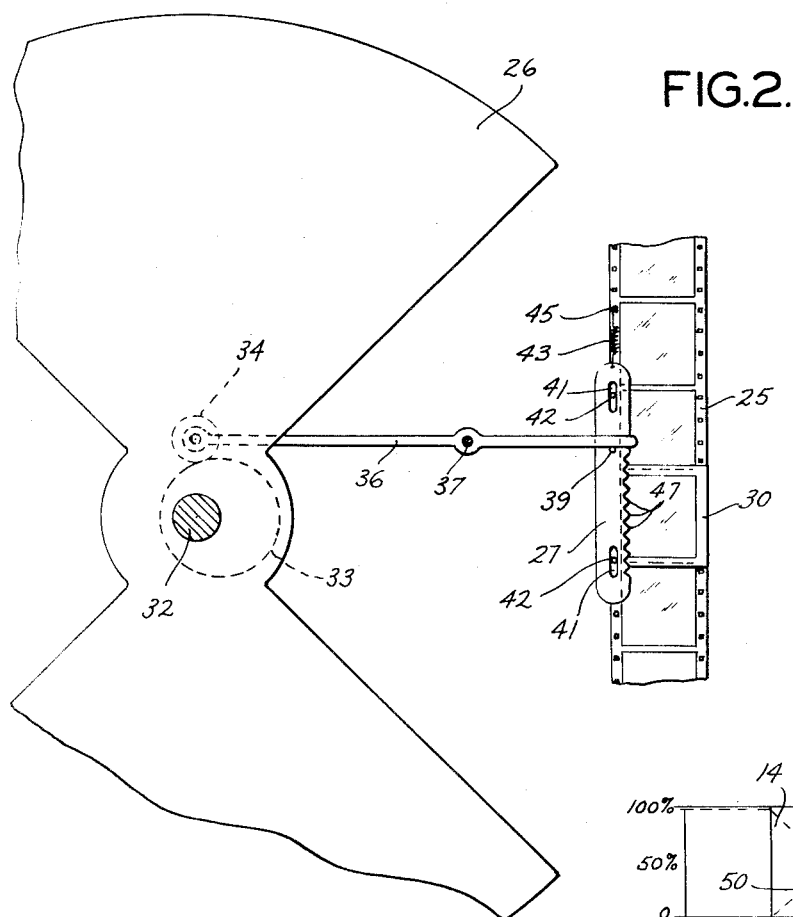
FIG.2.
FIG.4.
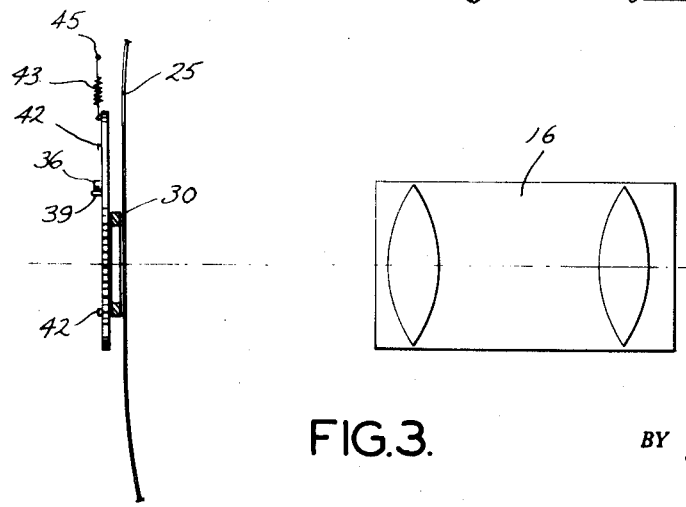
FIG.3.
INVENTOR.
Fred Waller
Richard C. Babish
BY Emery, Varney,
Whittemore & Vie
ATTORNEYS

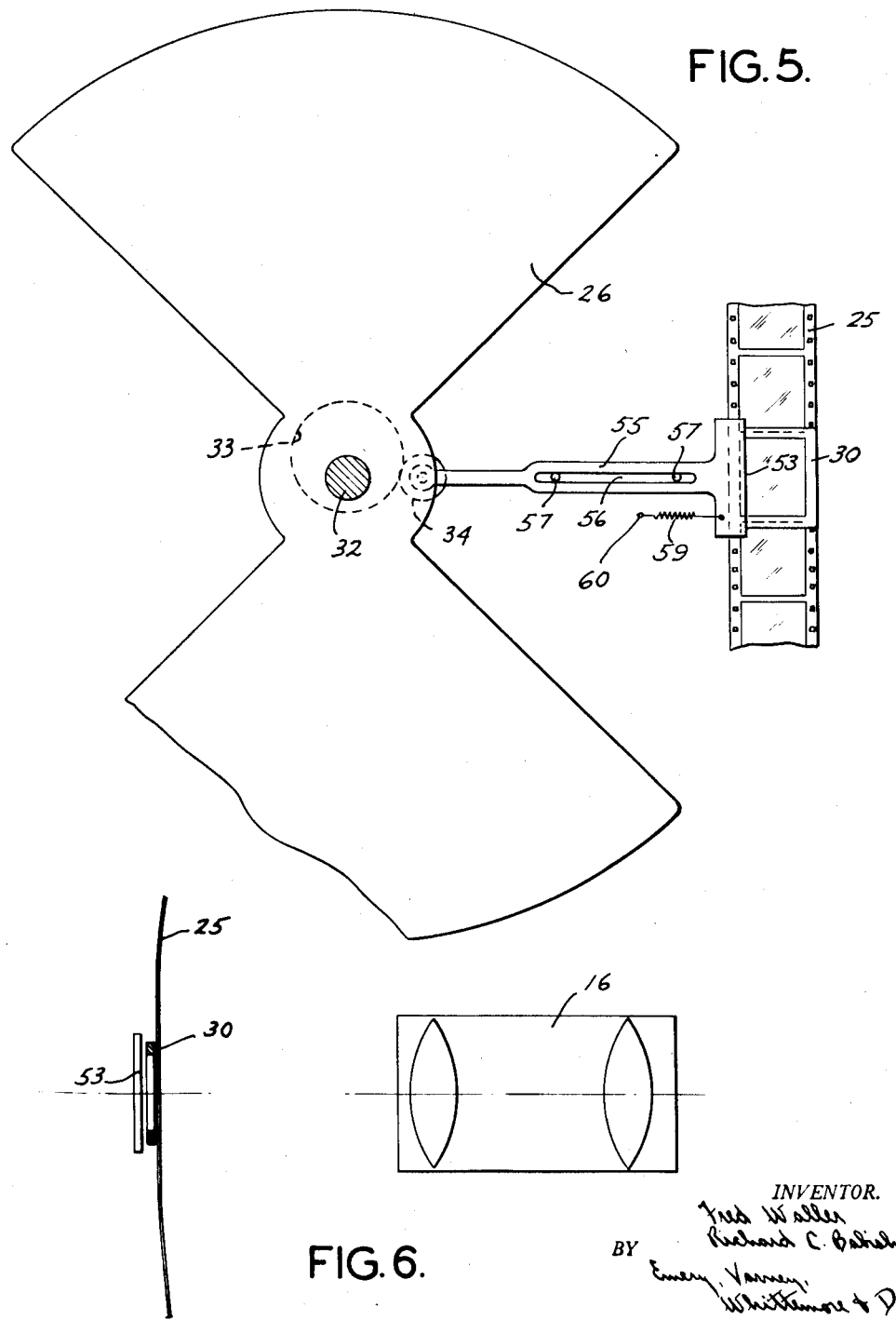

March 6, 1951  F. WALLER ET AL  2,544,116
MASKING OF MARGINAL EDGES OF OVERLAPPING
IMAGES OF MOSAIC PICTURES
Filed Jan. 8, 1948  4 Sheets-Sheet 4

INVENTOR.
Fred Waller
Richard C. Babish
BY Emery Varney
Whittemore & Dix
ATTORNEYS.

Patented Mar. 6, 1951

2,544,116

UNITED STATES PATENT OFFICE 2,544,116

MASKING OF MARGINAL EDGES OF OVERLAPPING IMAGES OF MOSAIC PICTURES

Fred Waller and Richard C. Babish, Huntington, N. Y., assignors to The Vitarama Corporation, Huntington Station, N. Y., a corporation of New York Application January 8, 1948, Serial No. 1,200

11 Claims. (Cl. 88—16.6)

This invention relates to apparatus for matching the edges of individual images that are projected on a screen to make a mosaic picture.

Masks for controlling the locations of the image edges cannot be placed in the exact plane for which the projector is focused and this results in a variation in the light intensity at the region of the screen on which the blurred images of the masks are projected. It is an object of this invention to provide apparatus for moving projector masks in such a way as to obtain light variations that produce invisible match lines between contiguous images in a mosaic picture. The masks of different projectors are moved in such correlation to one another that they control the light intensity over a common projection area of the screen, with complementary variations, so that the total light intensity of the screen area influenced by the masks is always substantially equal to that of the adjacent pictures. This makes the match line of the pictures invisible.

In its broader aspects the invention is applicable to any projected mosaic picture, whether made up of projected lantern slides or motion pictures. Some features of the invention are concerned particularly with motion pictures and relate to the operation of a dynamic mask in timed relation to the shutter of a motion picture projector. When an oscillating mask is used, it is desirable to synchronize the operation of the mask and shutter so that the stopping of the mask at each end of the stroke occurs while the shutter is closed and while there is no image of the mask edge on the screen.

Another object of the invention is to provide apparatus for moving a mask to produce a vignetted margin along one or more of the edges of a projected image for a mosaic picture. Other features relate to the obtaining of such vignetted margins by moving a mask transversely of the edge, or by moving a different type of mask laterally along the edge, and to mechanism for moving the mask without being influenced by play or lost motion in the mechanism.

Other objects, features, and advantages of the invention will appear or be pointed out as the description proceeds.

In the drawing, forming a part hereof, in which like reference characters indicate corresponding parts in all the views, Figure 1 is a diagrammatic plan view showing the way in which the invention is used to produce match lines for a mosaic picture, Figure 2 is a diagrammatic elevation showing apparatus for masking one edge of a motion picture film in a projector, Figure 3 is a side elevation of a portion of the apparatus shown in Figure 2, Figure 4 is a diagram illustrating the light intensity on the screen at and adjacent the match line of two overlapping images.

Figure 7:
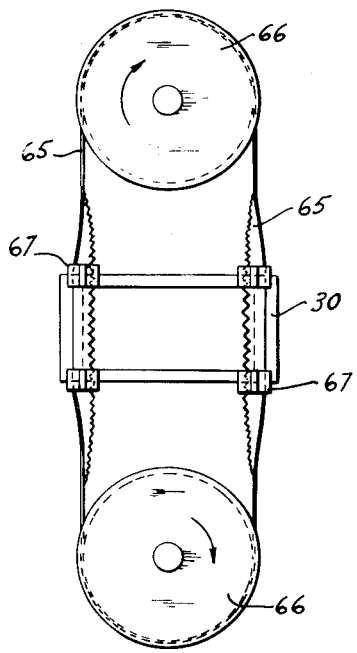
Figure 8:
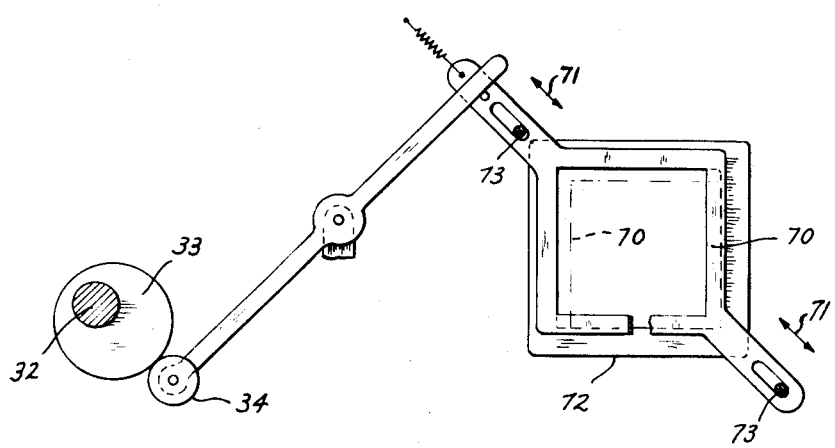

Figure 5 is a diagrammatic view, similar to Figure 2, but showing a modified form of the invention, Figure 6 is a side view of a portion of the apparatus shown in Figure 5, Figure 7 is a diagrammatic view showing a modified form of the invention particularly suited to the masking of lantern slides, Figure 8 is a diagrammatic elevation showing apparatus for masking all four edges of a picture.

Figure 1 shows a projector 1 with a lens 10 through which an image is projected on a cylindrical screen 12. This projected image extends from the line 14 to the line 15 on the screen. Another projector 2 includes a lens 16 for projecting an image that extends from a line 17 to a line 18 on the screen 12.

The images on the screen overlap between the lines 14 and 18 and these overlapping marginal zones of the images are masked so as to obtain a progressive decrease in the light of each picture across the overlapping zones, and toward the edge of the picture. For example, the image that extends from the line 17 to the line 18 progressively decreases in intensity from the line 14 to the line 18. Conversely, the image from the line 14 to the line 15 decreases progressively in intensity from the line 18 to the line 14.

The variation in light intensity in the marginal zone of each of the individual images is preferably a uniform variation, and since the illumination of the overlapping areas varies in opposite directions for the adjacent images, the total illumination at any point between the lines 14 and 18 is the same as the illumination of the screen 12 over the part of the screen covered by the adjacent images. The match line of the images is, therefore, invisible. In practice some departure from this idea is possible without having the match line noticeable, and with uniform variation of the light intensity in the marginal zones of the separate images, perfect overlapping of the marginal zones is not necessary to produce an invisible, or substantially invisible, match line.

A film 20 in projector 1 is periodically shut off from the source of light by a rotary shutter 21. A mask 22 along one edge of the picture frame of the film 20 produces the progressive change in light intensity between the lines 14 and 18 on the screen 12. A film 25 in projector 2 is periodically shut off from the light source by a shutter 26, and one edge of the picture frames of the film 25 is masked by a mask 27 which is moved in synchronism with the shutter 26 by motion transmitting connections between the mask 27 and the driving element of the shutter 26. This mask 27 produces the progressive and uniform decrease in light intensity from the line 18 to the line 14 in the marginal zone of the image projected on the screen by projector 2.

The mask casts a shadow on the screen 12 between the lines 14 and 18; and the movement of the mask is such that different points across this marginal zone are covered by the shadow of the mask for different periods of time. By having the shadow of the mask move rapidly and transversely of the visual axis of the observer, the edge of the shadow cannot be seen.

Persistence of vision causes the eye to integrate the light and dark periods at each point of the screen surface, and the illumination apparent to the eye is directly proportional to the product of the actual illumination multiplied by the length of time that the point remains illuminated. Since the actual illumination of all points of the screen in the marginal zone, during the time that they are illuminated from a projector, is equal to the full screen illumination of the adjacent image, the apparent illumination of each point of the marginal zone by that projector is directly proportional to the time that the point is not covered by the shadow of the mask. This time can be controlled by the motion of the mask; and by the shape of the mask edge when a tortuous edge is used and moved longitudinally of the marginal zone.

Figure 2 shows the operating mechanism for the mask 27 on a larger scale. The film 25 is moved intermittently past a film gate 30 by conventional mechanism. The shutter 26 is connected with a driving shaft 32. An eccentric cam 33 on the drive shaft 32 operates a cam follower 34 located at one end of a lever 36. This lever 36 rocks on a fulcrum 37, and the end of the lever 36 beyond the fulcrum 37 contacts with a driving pin 39 extending from the mask 27.

The mask 27, which may be of sheet metal, or other material that is capable of withstanding the heat of the projector, has guide slots 41 through which studs 42 extend. These studs 42 are connected with a permanent support on the projector and they prevent transverse movement of the mask 27 without interfering with the vertical movement of the mask.

A tension spring 43 is connected at its lower end with the mask 27 and at its upper end with a stud 45 extending from a fixed part of the projector. The mask 27, therefore, has a bias toward a raised position, and it is held down against the tension of the spring 43 by pressure of the lever 36 against the top of the driving pin 39. As the eccentric cam 33 rotates and rocks the lever 36 about its fulcrum 37, an up-and-down oscillating motion is imparted to the mask 27.

The edge of the mask 27 that overlaps the picture area of the film gate 30 is made with a tortuous edge, preferably with saw teeth 47. The size of the teeth 47 depends upon the desired width of the marginal zone of the image on the screen and depends upon the intended stroke through which the mask 27 is to be oscillated. In order to obtain uniform gradation of the light intensity in the marginal zone influenced by the mask 27, the mask should move through a stroke at least equal to the width of the base of one of the teeth 47, and it is preferable to have the stroke of the mask even longer.

The eccentric cam 33 on the shaft 32 is set at such a phase angle with respect to the shutter 26 that the mask 27 is in motion while the shutter is open, and the stopping and reversing of the mask occurs while the shutter is closed. This makes it possible to operate the mask with lower acceleration without danger of having the teeth 47 become momentarily visible as the mask stops and reverses.

Figure 4 shows the way in which the light intensity varies between the lines 14 and 18. From the full screen illumination to the right of the line 18, the oscillating mask causes a decrease in light intensity, as represented by the line 50, to substantially zero intensity at the line 14. The corresponding mask in the other projector produces a decrease in light intensity from the line 14, in accordance with the graph line 51, to a value of substantially zero intensity at the line 18. It will be apparent that the sum of the light from the two projectors, at any point between the lines 14 and 18, will always be approximately equal to the full screen illumination on both sides of the overlapping areas of the images. Although it is more desirable to have the light variation uniform, which is indicated by the fact that the lines 50 and 51 are straight, but this is not essential. As long as the light variation represented by the line 50 is complementary as that represented by the line 51 so that the total screen illumination at any point across the zone is always equal to approximately 100%, invisible match lines can be obtained. The straight line variation has the advantage, however, that it does not require as perfect overlapping of the marginal zones of the individual images in order to produce an invisible match line.

Figure 5 shows a modified form of the invention in which a mask 53, having a straight edge, is used to graduate the light intensity along the marginal zone of an image by reciprocating the mask in a direction transverse of the edge of the picture frame. The mask 53 is connected with a support 55 having a slot 56 through which studs 57 extend. These studs 57 serve as bearings on which the support 55 oscillates. A tension spring 59, stretched between the mask 53 and a stationary pin 60, gives the mask 53 a bias toward the left. A cam follower 34 at one end of the support 55 runs on the eccentric cam 33 driven by the shaft 32.

The phase angle of the eccentric cam 33 is correlated with the shutter 26 so that the mask 53 is at the extreme right-hand end of one stroke at the mid point of the closed period of one segment of the shutter, and is at the extreme left-hand end of its stroke at the mid point of the closed period of the other shutter segment. The stroke of the mask 53 is correlated with the edge of the picture frame so that the edge of the mask 53 is even with the edge of the picture frame when the shutter opens during the movement of the mask 53 toward the right, and is at this same position when the shutter closes during the movement of the mask 53 to the left. The stroke of the mask 53, while the shutter is open, depends upon the throw of the eccentric 33 which must be designed for the width of overlap desired.

The invention has been described thus far for use with motion pictures, but it can be used for slide projectors if continuously moving masks are employed, or if the rate of reciprocation of the mask is made fast enough so that the stopping and reversing of the masks is not noticeable on the screen. When a continuously moving mask is needed, saw teeth masks moving in the direction of the mask edge are employed.

Figure 7 shows an endless saw tooth mask 65 which runs over upper and lower wheels 66. The blade 65 is turned by rollers 67 to bring the sides of the blade 65 into parallelism with the plane of the film gate 36, or near enough into parallelism to cause the shadows of the teeth of the blades 65 to overlap the marginal zones of the picture frame over which gradation of light intensity is desired.

With the dynamic mask shown in Figure 7 both vertical edges of the picture frame are masked to produce marginal zones of decreasing light intensity on the screen. The masks shown in Figures 2 and 5 can be modified to mask both vertical edges of the picture by shaping the mask so as to obtain confronting edges on both sides of the film gate. The same motion is suitable for both edges. If the masks move rapidly enough, it is not necessary to synchronize the operation of the mask of one projector with that of the other projector.

With some mosaic pictures, match lines at the top and bottom of the individual pictures are required. These may be obtained with dynamic masks similar to those shown in Figures 2, 5 and 7, if the masks are located along the top and bottom edges of the picture frames.

Sometimes it is desirable to mask three or even four edges of an individual picture with masks that produce marginal zones of progressively decreasing light. This can be done with a mask 70, such as shown in Figure 8. This mask 70 is oscillated in the direction of the arrows 71 diagonally across the opening of film gate 72, and may be operated by apparatus similar to that shown in Figure 5 with the necessary change in motion transmitting mechanism to produce the different direction of movement. Figure 8 shows the mask 70 supported on pins 73 and free to slide on these pins which extend through slots in projecting portions of the mask. A spring biases the mask 70 toward the upper end of its stroke, and a lever 75 presses against a pin 76 that extends out from the mask 70. The lever 75 is rocked about a fulcrum 78 by a cam follower 43 running on the eccentric cam 33. The operation of the mask 70 in Figure 8 is similar to that of the mask 53 in Figure 5 in that both of them move in directions transverse of the picture edge being masked. It will be evident from a comparison of these two figures that the term "transverse," as used herein, does not mean a direction at right angles to the edge but merely a direction that is not substantially parallel to the edge of the picture frame. When the mask is to be moved in a direction that is parallel to the edge being masked, it is necessary to use a saw tooth or other tortuous edge in order to get the dynamic masking effect.

In using the dynamic masks of this invention, it is advantageous to locate the masks behind the film or other transparency that is being projected on the screen. The shadow of the mask is thus cast on the film to influence the amount of light that passes through the picture. This insures against diffraction and interference effects which can result from the location of sharp mask edges or toothed masks with very small teeth in front of the film. Putting the dynamic mask behind the film effectively minimizes any reduction in the resolving power or sharpness of the image and it becomes practical to use masks with smaller teeth and with consequent simplification of the oscillating mechanism.

Terms of orientation in the description and claims are, of course, relative. Various modifications and changes can be made, in addition to those already described, and some features of the invention can be used alone or in different combinations without departing from the invention as defined in the claims.

We claim as our invention:

1. The combination of a plurality of projectors that are located in positions to project individual contiguous images for a mosaic picture with adjacent edge portions of the individual images overlapping one another across a zone, a mask associated with each projector in position to mask the edge portion of the image which overlaps the edge portion of the image projected by the other projector, and mechanism that oscillates both of the masks at frequencies high enough to prevent the mask edges from being visible on the screen and with the timing of the oscillations of one mask coordinated with the timing of the oscillations of the other mask in a manner that produces substantially complementary gradations of light in opposite directions, the mechanism that oscillates the masks including means that limit the strokes of the masks to regions in which the shadows of the masks on the screen images are limited substantially to the overlapping zone of the images on the portion of the screen on which the marginal edges of the individual pictures overlap one another.

2. The combination comprising two projectors that project individual contiguous images for a mosaic picture on a screen, a mask associated with each projector in position to mask that edge of the picture which must be matched with the picture projected by the other projector, and mechanism for oscillating the masks of both projectors in timed relation with one another in a manner that produces substantially complementary gradations of light along edges of the individual images over a portion of the screen on which the individual images overlap one another.

3. Projection apparatus comprising two projectors in position to project images on a screen with marginal edge zones of said images overlapping one another across a zone, a mask in each projector, and mechanism for moving the masks at frequencies high enough to prevent the mask edges from being visible on the screen and with the timing of the oscillations of one mask coordinated with the timing of the oscillations of the other mask so as to produce a substantially complementary gradation of light from full image illumination to no illumination on the overlapping marginal edge zones, the mechanism that oscillates the masks including means that limit the strokes of the masks to regions in which the shadows of the masks on the screen images are limited substantially to the overlapping zone of the images so that the total illumination at all points on the overlapping area is substantially equal to the full screen illumination of the adjacent image areas.

4. Projection apparatus including two projectors in positions to project separate images on a screen for a mosaic picture and with marginal edge zones of said images overlapping one another, a mask in each projector in position to mask that edge zone of an image which overlaps the marginal edge zone of the other image, a support on which each mask is movable transversely of the direction of extent of the masked edge of the image, and mechanism for moving the mask on said support, in a manner that produces substantially complementary variations in the light across the marginal edge zones of the respective images.

5. The combination of two projectors for projecting on a screen individual images having marginal edge zones that overlap, a mask in each projector, a tortuous masking edge on each mask, and mechanism for moving each mask in a direction substantially parallel to the direction of extent of the masked edge of the image to produce a gradation of light across the marginal zone of the projected image, said masks being shaped and moved so as to give substantially complementary gradations of light across the marginal zones of the respective images.

6. Apparatus for projecting mosaic pictures on a screen, said apparatus comprising two or more projectors in position to project individual images with overlapping marginal zones at the match lines of said images, masks in the projectors for producing gradations of light intensity on the overlapping marginal zones of the projected images, each of said masks having saw tooth edges with the saw teeth that mask one marginal zone turned in the opposite direction from the saw teeth that mask the overlapping marginal zone of the contiguous image, the teeth of one mask being so shaped with respect to the teeth of the other mask that the gradations of light intensity of the marginal edge zone of one image is substantially complementary to that of the marginal edge zone of the other image, and mechanism for moving the masks in the direction in which the bases of the teeth extend.

7. Apparatus for producing mosaic motion pictures, said apparatus comprising two moving picture projectors with shutters synchronized with one another, said projectors being located in positions to project on a screen individual images with overlapping marginal zones, a mask in each projector in position to produce gradation of light across the overlapping marginal zone of the image projected on the screen, and mechanism for oscillating the masks in timed relation with the shutters of the motion picture projectors and in timed relation with each other.

8. The combination with a motion picture projector that has a shutter, of a mask, and mechanism for oscillating the mask in timed relation with the shutter and in directions to vignette the marginal edge zone of an image projected by said projector, and at a rate that obtains a predetermined gradation of light across the marginal edge zone throughout the full length of said edge zone.

9. Motion picture projector apparatus for projecting an individual image for a mosaic picture, said apparatus comprising a shutter, a film gate, a mask for masking a marginal edge zone of a picture frame at the film gate, and mechanism that operates in timed relation to the shutter for oscillating the mask in a direction to produce a gradation of light across said marginal edge zone.

10. A motion picture projector including a shutter, mechanism for operating the shutter, a film gate, a mask adjacent one edge of the film gate, a support on which the mask is movable back and forth to cast a moving shadow that produces a gradation of light along the marginal zone of a picture frame at the film gate, a spring connected with the mask and that produces a bias urging the mask to move in one direction, a cam connected with the shutter operating mechanism, a cam follower, and motion transmitting connections between the cam follower and the mask for moving the mask against the spring bias.

11. Apparatus for projecting an image for a mosaic picture with marginal edge zones on opposite sides of the picture having graduated light intensity for matching with overlapping edge zones of adjacent images, said apparatus including an endless band having a scalloped edge, a gate through which light is projected to make the image, means above and below the gate for reversing the run of the band, means for moving the band at a speed which makes the shadows of the scallops invisible, a guide at one side of the gate holding the descending portion of the band in position with its scalloped edge extending into the light beam that passes through the gate, and another guide at the other side of the gate in position to hold the ascending portion of the band in position with its scalloped edge extending into the light beam.

FRED WALLER.
RICHARD C. BABISH.

REFERENCES CITED

The following references are of record in the file of this patent:

UNITED STATES PATENTS

| Number | Name | Date |
|---|---|---|
| 1,136,236 | Killman | Apr. 20, 1915 |
| 1,666,304 | Proctor | Apr. 17, 1928 |
| 1,808,352 | Hollen | June 2, 1931 |

FOREIGN PATENTS

| Number | Country | Date |
|---|---|---|
| 298,615 | Great Britain | Jan. 13, 1930 |

OTHER REFERENCES

The Science and Practice of Photographic Printing, third edition, revised by L. I. Snodgrass, pages 237 and 238.